United States Patent
Hemmer et al.

(10) Patent No.: US 10,553,015 B2
(45) Date of Patent: Feb. 4, 2020

(54) IMPLICIT VIEW-DEPENDENT QUANTIZATION

(71) Applicant: GOOGLE INC., Mountain View, CA (US)

(72) Inventors: Michael Hemmer, San Francisco, CA (US); Stephan Friedrichs, Saarbrucken (DE)

(73) Assignee: GOOGLE LLC, Mountain View, CA (US)

(*) Notice: Subject to any disclaimer, the term of this patent is extended or adjusted under 35 U.S.C. 154(b) by 12 days.

(21) Appl. No.: 15/476,895

(22) Filed: Mar. 31, 2017

(65) Prior Publication Data
US 2018/0286107 A1    Oct. 4, 2018

(51) Int. Cl.
*G06T 15/20* (2011.01)
*G06T 19/00* (2011.01)
*G06T 19/20* (2011.01)

(52) U.S. Cl.
CPC .......... *G06T 15/205* (2013.01); *G06T 19/003* (2013.01); *G06T 19/20* (2013.01); *G06T 2200/04* (2013.01); *G06T 2200/08* (2013.01); *G06T 2207/20108* (2013.01)

(58) Field of Classification Search
CPC .............................. G06T 15/205; G06T 19/003
See application file for complete search history.

(56) References Cited

U.S. PATENT DOCUMENTS

| 5,933,193 A | 8/1999 | Niesen | |
| 2004/0170318 A1* | 9/2004 | Crandall | G06K 9/4652 382/165 |
| 2006/0062478 A1 | 3/2006 | Cetin et al. | |
| 2009/0161989 A1* | 6/2009 | Sim | H04N 19/597 382/285 |
| 2009/0190914 A1* | 7/2009 | Scott | G03B 17/24 396/311 |
| 2010/0141666 A1 | 6/2010 | Christopher et al. | |
| 2012/0020549 A1* | 1/2012 | Lee | H04N 19/597 382/154 |
| 2015/0104096 A1* | 4/2015 | Melax | G06T 7/004 382/154 |
| 2016/0245077 A1* | 8/2016 | Willis | E21B 47/102 |
| 2016/0285587 A1* | 9/2016 | Noest | H04L 25/06 |

OTHER PUBLICATIONS

Kalaiah, et al., "Statistical Geometry Representation for E±cient Transmission and Rendering", ACM Transactions on Graphics, vol. 24, Issue 2,, Apr. 2005, 348-373.
Peng, et al., "A Generic Scheme for Progressive Point Cloud Coding", IEEE Transactions on Visualization and Computer Graphics, Apr. 2008, 15 pages.

(Continued)

*Primary Examiner* — Yi Yang
(74) *Attorney, Agent, or Firm* — Brake Hughes Bellermann LLP

(57) ABSTRACT

An encoder includes a processor and a memory. The memory includes code as instructions that cause the processor to receive geometric data and a viewpoint associated with the geometric data, and quantize the geometric data based on the viewpoint using a plurality of view-dependent quantization values each having a quantized distance based on a proximity to the viewpoint.

14 Claims, 7 Drawing Sheets

(56) References Cited

OTHER PUBLICATIONS

Wong, et al., "Compression of Illumination-Adjustable Images", IEEE Transactions on Circuits and Systems for Video Technology, vol. 13, Issue 11, Nov. 2003, 30 pages.
International Search Report and Written Opinion for International Application PCT/US2017/059506, dated Apr. 19, 2018, 15 pages.
Domanski, et al. "High Efficiency 3D Video Coding Using New Tools Based on View Synthesis"; IEEE Transactions on Image Processing, IEEE Service Center, vol. 22, No. 9, Sep. 1, 2013, pp. 3517-3527.
Stankiewicz, et al., "Nonlinear Depth Representation for 3D Video Coding"; 2013 IEEE International Conference on Image Processing, Sep. 15, 2013, pp. 1752-1756.

\* cited by examiner

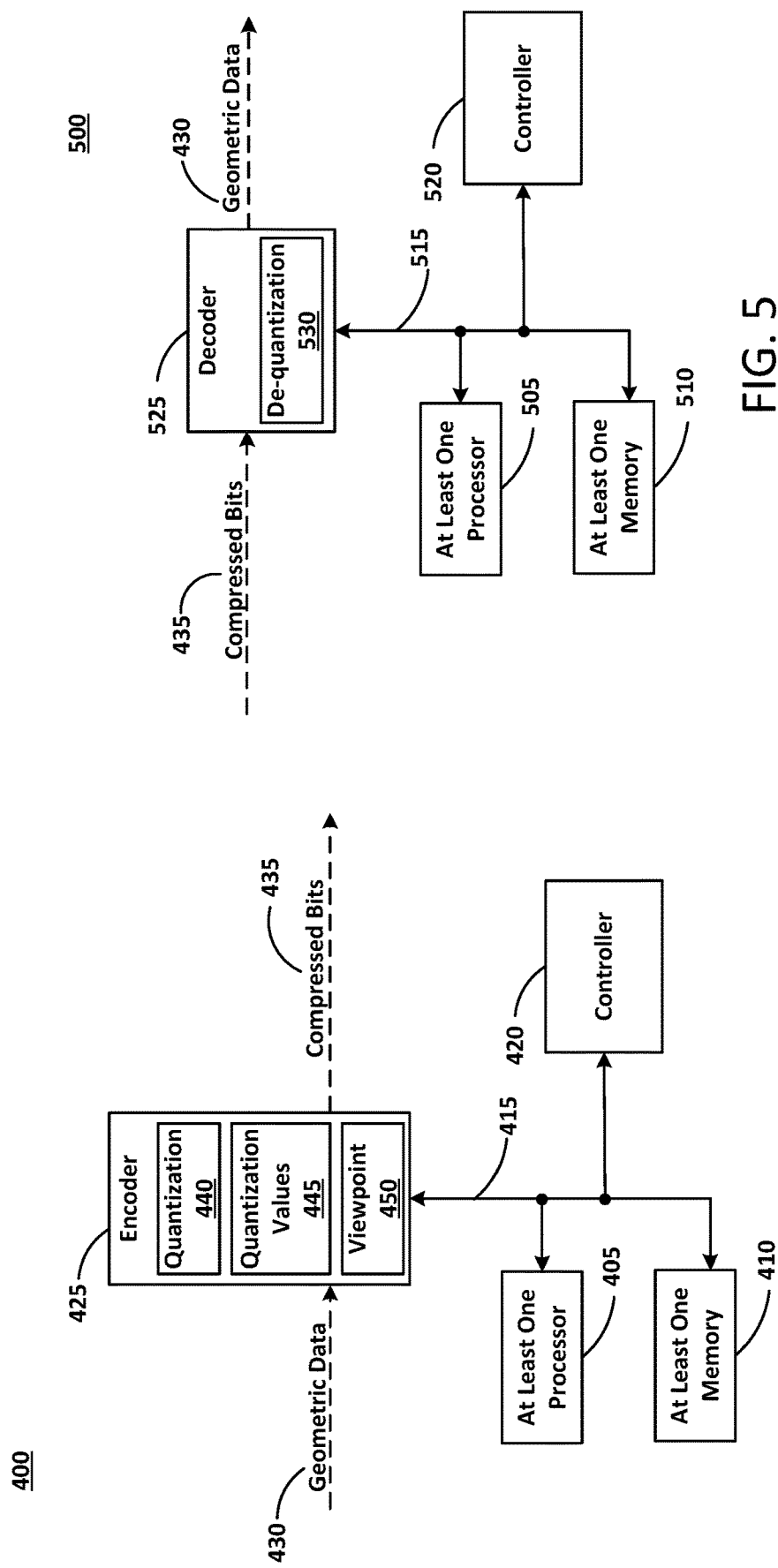

IMPLICIT VIEW-DEPENDENT QUANTIZATION

FIELD

Embodiments relate to quantizing data (e.g., 3D scene data, point cloud data, and the like).

BACKGROUND

Quantization techniques can snap each original point of data to its nearest quantized location. However, quantization techniques typically distribute the quantized locations uniformly, regardless of their location. This approach results in a quantization error that is the same throughout an entire scene represented by the data.

SUMMARY

Example embodiments describe systems and methods to quantize video data.

In a general aspect, an encoder includes a processor and a memory. The memory includes code as instructions that cause the processor to receive geometric data and a viewpoint associated with the geometric data, and quantize the geometric data based on the viewpoint using a plurality of view-dependent quantization values each having a quantized distance based on a proximity to the viewpoint.

In another general aspect, a method includes receiving geometric data and a viewpoint associated with the geometric data, and quantizing the geometric data based on the viewpoint using a view-dependent quantization value having a quantized distance based on a proximity to the viewpoint.

In yet another general aspect, a non-transitory computer readable storage medium having code as instructions that cause a processor to receive geometric data and a viewpoint associated with the geometric data, and quantize the geometric data based on the viewpoint using a plurality of view-dependent quantization values having a quantized distance based on a proximity to the viewpoint.

Implementations can include one or more of the following features. For example, the plurality of view-dependent quantization values have a quantized distance that is less coarse close to the viewpoint and more coarse with increasing distance from the viewpoint. The plurality of view-dependent quantization values are based on a distance z of a point from the viewpoint, and transforming the distance z to $z'=1/(1+z)$. The plurality of view-dependent quantization values are based on a distance z of a point from the viewpoint, and transforming the distance z to $z'=1/(z+d)$ for any $d>0$. The view-dependent quantization values are re-determined based on at least one of a change in the viewpoint and a change in a scene represented by the geometric data. The geometric data represents a point cloud and the geometric construct is a two or more dimensional shape encompassing the point cloud. The quantizing of the geometric data includes one of mapping a value associated with a point of the geometric data to the view-dependent quantization value that is less than the value associated with the point, mapping a value associated with a point of the geometric data to the view-dependent quantization value that is greater than the value associated with the point, and mapping a value associated with a point of the geometric data to the view-dependent quantization value that minimizes an error associated with the point.

BRIEF DESCRIPTION OF THE DRAWINGS

Example embodiments will become more fully understood from the detailed description given below and the accompanying drawings, wherein like elements are represented by like reference numerals, which are given by way of illustration only and thus are not limiting of the example embodiments and wherein:

FIG. 4 illustrates an encoder system according to at least one example embodiment.

FIG. 5 illustrates a decoder system according to at least one example embodiment.

Figure 1A:
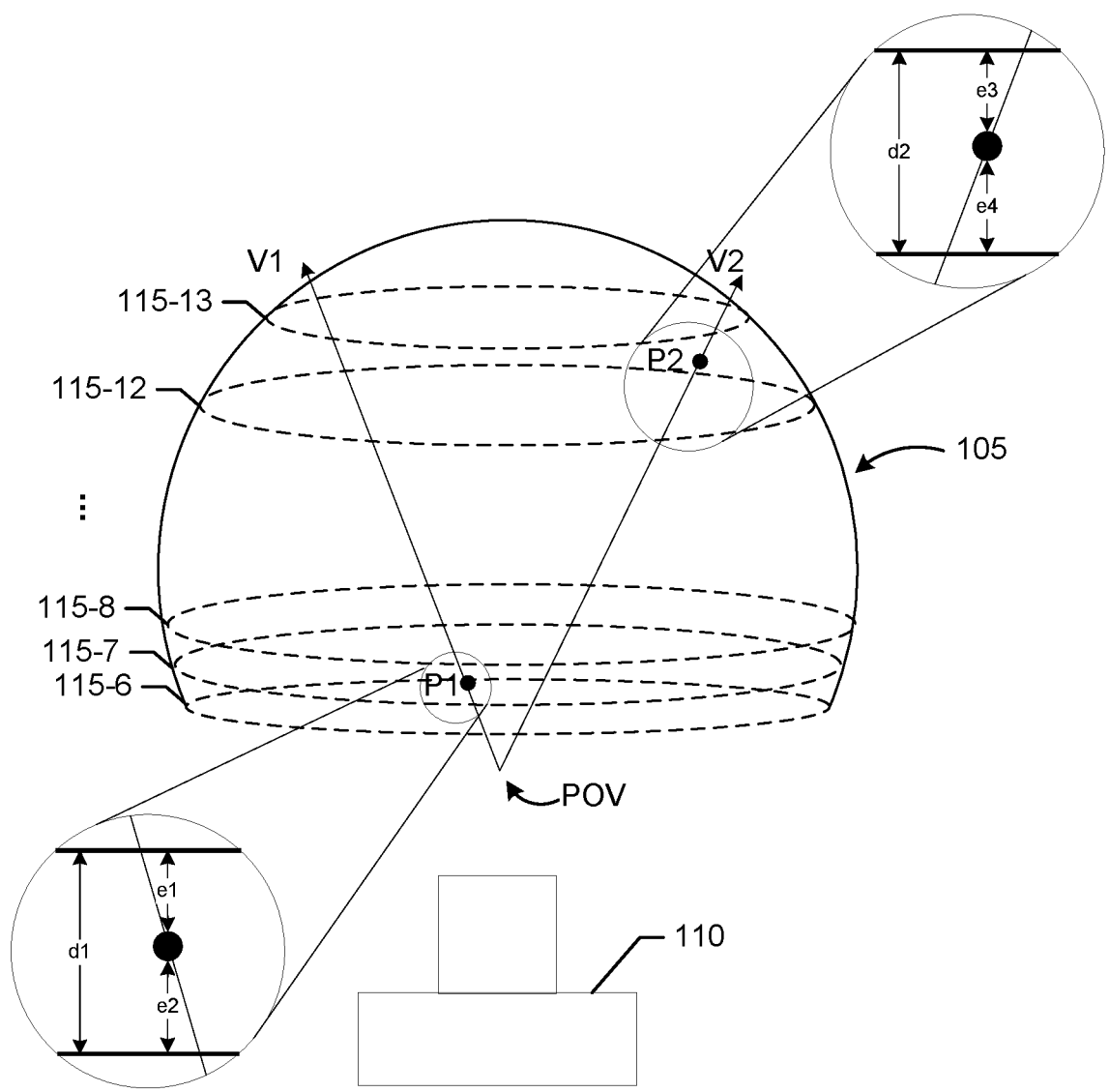
FIG. 1A illustrates an example three-dimensional (3D) geometric shape according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

A high definition 3D scene (also referred to as a 3D scene or a scene) may be captured and/or generated using, for example, CGI, a scanner, a camera, and/or the like and/or using software using these tools as input. The 3D scene may include points indicating texture information, as well as color information associated with these points. The texture information can include texture mapped triangles or polygons having vertices, textured planes, mesh data mesh data, and/or the like. The 3D scene can represent an object (e.g., a chair, a baseball bat, and/or the like), a place (e.g., a room, a building, and/or the like), and/or the like. The 3D scene can also be a point cloud of randomly generated points that may not represent a real world object. The 3D scene can be stored in a memory, encoded and served to a device (e.g., a mobile device, a VR device, and the like) for decoding and rendering on the device using, for example, a 3D graphics card. The device can also decode the encoded 3D scene as input to software that does not render the 3D scene on the device, but instead uses the data for some other purpose.

The texture information can be stored as a point cloud including point coordinates represented in any coordinate system. The points can be converted between one or more coordinate system. For example, the coordinate systems can use angles and/or distances having values that can be quantized using the view-dependent quantization techniques described in this disclosure.

In an example implementation, the point cloud can be a high resolution scene. The high resolution scene can be served to a mobile device (e.g., a mobile VR device) with limited capabilities (e.g., processing capabilities, memory, bandwidth, and/or the like). In this example, the POV can be limited to a small region of the scene. This allows the view dependent quantization of the scene to be used as a first step in the encoding pipeline. As a result, the compression rates that allow efficient use of bandwidth (likely limited to cellular capabilities) when transmitting to the mobile device. Further, the view dependent scene representation on the mobile device after decoding can be smaller (as compared to other quantization techniques). Accordingly, the decoded scene can use less memory on the mobile device.

The above example scenarios describe single/multiple viewpoint scenarios. However, example embodiments are not limited thereto. For example, view-dependent quantization can be based on computer generated scenes or models (e.g., computer-generated imagery (CGI), computer generated animation and the like). In this case, the POV can be selected by a creator of the video (e.g., a director, an animator, and the like). Accordingly, a number of POVs may be selectable by a viewer of the video. Therefore, a viewer of the video can select a POV through some viewer action. As a result of the selection, view-dependent quantization is implemented on video associated with the selected POV.

The point coordinates representing the 3D scene can be stored (e.g., in memory) as float or double precision bit representation data. However, a float or double precision value can be more precise than is needed (e.g., to reconstruct the data with an acceptable amount of loss). As an example, the point cloud may be generated by a scanner (e.g., scanning an exterior of a building) with some measurement error. In other words, the camera or scanner has some error (typically small depending on the quality of the device) with regard capturing data (e.g., color, distance, depth, and the like) and/or storing the captured data (e.g., memory limitations). Accordingly, a significant portion of the lower bits of data records from the point cloud can be noise or can include the measurement error and/or a high precision may not needed or desired for the application. Quantization of data from the point cloud may remove the lower bits based on a desired precision (e.g., for a given application).

Quantization can include mapping or converting a range of values (e.g., float or double) to a single quantum value. Quantization can convert the float or double precision values associated with the point cloud into a b-bit long integer representation. Quantization techniques can snap each original point to its nearest quantized location. However, quantization techniques typically distribute the quantized locations uniformly, regardless of their location within the point cloud. The consequence of this approach is that the maximal quantization error (e.g., the maximum distance between the original point and its corresponding quantized point) is the same throughout an entire scene represented by the point cloud. When viewing the scene from a viewpoint (POV), the quantization error can result in perceivable artifacts (e.g., distortion) close to the viewpoint. In other words, a small quantization error close to the viewpoint is perceived or viewed as a large error in a decoded and rendered scene. However, small quantization errors that are not close to the viewpoint may not lead to perceivable or viewed artifacts in the decoded and rendered scene.

According to example embodiments, quantization can be based on the viewpoint. For example, viewpoint dependent or view-dependent quantization can quantize less coarsely close to the viewpoint and more coarsely with increasing distance from the viewpoint while limiting the number of quantization points. The viewpoint can be based on an intended, desired, selected and/or configured viewing position with respect to the scene or point cloud.

Figure 1B:
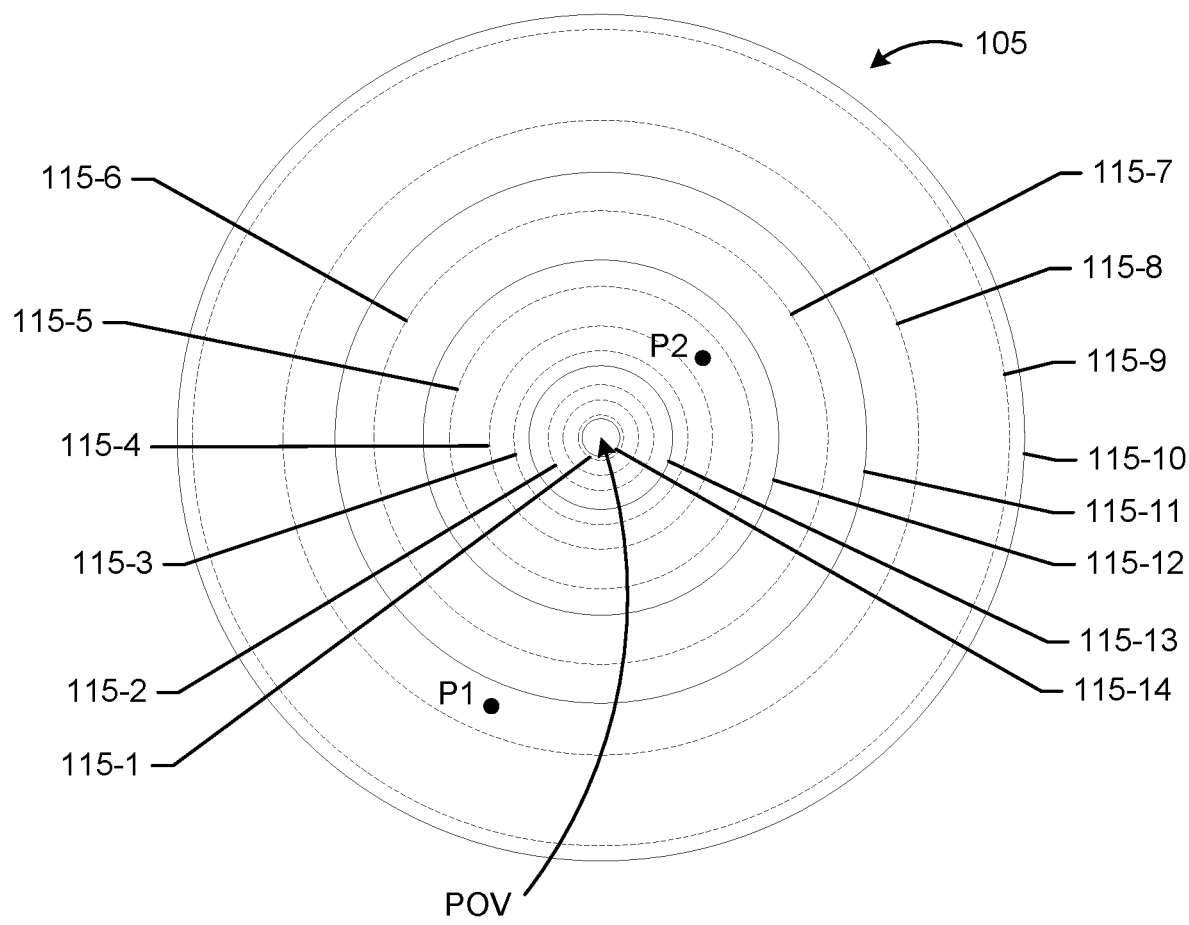
FIG. 1B illustrates a top view of a 2D slice of the 3D geometric shape shown in FIG. 1A.

FIG. 1A illustrates an example three-dimensional (3D) geometric shape according to at least one example embodiment. The geometric shape shown in FIG. 1A is shown as a portion of a sphere or a truncated sphere 105, hereinafter sphere 105, representing a point cloud. FIG. 1B illustrates a top view of a 2D slice of the 3D geometric shape shown in FIG. 1A.

The point cloud could be and/or the corresponding geometric construct can be a two or more dimensional shape representing a scene. The point cloud can include a plurality of points represented by point P1 and point P2. In this example, points P1 and P2 represent a position within the point cloud and are described as though the POV is static and the scene is static in order to simplify the description. The position of point P1 and point P2 can be defined using any spherical notation. For example, the position of point P1 and point P2 can be defined using a direction (e.g., angle) associated with vector V1 and vector V2 respectively, and a distance (e.g., from an origin) along vector V1 and vector V2 respectively. Although two points and two vectors are shown, implementation can include many points and vectors (e.g., thousands, millions or more points and vectors).

Camera 110 can be a virtual camera used to simulate capturing an image of the scene. The camera 110 can be at a position or viewpoint with respect to the sphere 105. POV illustrates the viewpoint with respect to the sphere 105. View-dependent quantization values (shown in FIGS. 1A and 1B) 115-1, 115-2, 115-3, 115-4, 115-5, 115-6, 115-7, 115-8, 115-9, 115-10, 115-11, 115-12, 115-13, and 115-14, shown as lines in FIG. 1A and circles in FIG. 1B, each represent a quantum value with respect to the POV. As shown, the view-dependent quantization values 115-1 to 115-14 include quantum values spaced less coarsely close to the POV and more coarsely from the POV (e.g., with increasing distance between the quantum values with increasing distance from the POV).

Point P1 is disposed between the line representing view-dependent quantization value 115-7 and the line representing view-dependent quantization value 115-8. Therefore, in a quantization operation, point P1 could be assigned a quantum value corresponding to view-dependent quantization value 115-7 or view-dependent quantization value 115-8. Further, point P2 is disposed in-between the line representing view-dependent quantization value 115-12 and the line representing view-dependent quantization value 115-13. Therefore, in a quantization operation, point P2 could be assigned a quantum value corresponding to view-dependent quantization value 115-12 or view-dependent quantization value 115-13. The quantum value corresponding to view-dependent quantization value 115-7 is different (e.g., a smaller value) as compared to view-dependent quantization value 115-8. Therefore, assigning point P1 the quantum value corresponding to view-dependent quantization value 115-7 results in truncating P1 differently than if point P1 were to be assigned view-dependent quantization value 115-8.

The difference d1 (referred to below as a quantized distance) between the view-dependent quantization value 115-7 and view-dependent quantization value 115-8 is smaller than the difference d2 between the view-dependent quantization value 115-12 and view-dependent quantization value 115-13. In other words, the quantized distances close or proximate to the viewpoint (e.g., POV) have less coarse spacing, as compared to more distant points which have more coarse spacing (e.g., d1<d2). Therefore, an artifact (e.g., error) e1, e2 associated with a point (e.g., P1) quantized to either view-dependent quantization value 115-7 or view-dependent quantization value 115-8 can be relatively smaller as compared to an artifact (e.g., error) e3, e4 associated with a point (e.g., P2) quantized to either the view-dependent quantization value 115-12 and view-dependent quantization value 115-13. As a result, when viewing a reconstructed (e.g., decoded) scene, the quantization error is small close or proximate to the viewpoint when compared to the quantization error distant to the viewpoint. Therefore, perceivable artifacts (e.g., distortion) close to the viewpoint is minimized using this technique.

In an example implementation, quantization can be implemented in two steps. The first step is to determine a distance z of a point P from the viewpoint (e.g., POV). The distance z is then transformed to $z'=1/(1+z)$, and uniformly quantize z'. As a result the quantized distances close to the viewpoint are preserved with little to no error (e.g., less coarse spacing), as compared to more distant points (e.g., more coarse spacing). Alternatively, distance z can be transformed to $z'=1/(z+d)$ for any $d>0$.

Each quantized distance can yield a $(k-1)$-dimensional surface S of uniform distance around the viewpoint. Knowing that distance leaves $k-1$ dimensions to be described and quantized. Quantization can be uniform on the surface S, for example, the angles of polar coordinates, XY-coordinates in image space, or the octahedral approach could be quantized on the surface S as described in more detail below. However, example embodiments are not limited to a specific coordinate system.

For example, as mentioned above, the distance z from POV can be transformed to $z'=1/(1+z)$. However, z can be transformed to $z'=f(z)$ for any function f, such that (a) a non-view-dependent, e.g., uniform quantization techniques of z' yield a higher sampling density for the z-intervals close to the viewpoint(s)/areas of interest and (b) $f^{-1}(q)$ is uniquely determined for all quantized values q. For example, $z'=1/z$ with $z>0$. Further, z can be transformed to $z'=1/(a*z+b)$, with a and b some positive numbers. In addition, z can be transformed to $z'=1/(a*z^c+b)$, with $a>0$ and $b>0$ and $c>=1$. Still further, z can be transformed to $z'=1/(a*z+b)^c$, with $a>0$ and $b>0$ and $c>=1$.

As mentioned above, points P1 and P2 represent a position within the point cloud. In an example implementation, the POV is essentially static and the scene is static or dynamic. The scene could be a room (e.g., in a house or a building) and the POV could be a position within the room. Therefore, a high resolution 3D point cloud representing the room (e.g., similar to a high resolution image) can be encoded using view-dependent quantization with view-dependent quantization values based on the position within the room. In, for example, a virtual reality environment, the viewer could explore the room with little to no distortion (or artifacts or error) around the POV because the scene was encoded using view-dependent quantization, while still benefiting from a considerable data reduction due to the view dependent quantization The point coordinates associated with the point cloud can be represented using an X, Y, Z coordinate system, an angle distance coordinate system, a two angles alpha [0,360] and beta [0,180] coordinate system, an alternative rational parameterization of the circle coordinate system, an octahedron coordinate system, a cubic coordinate system, and the like. View-dependent quantization can be implemented for each coordinate value (e.g., a distance and/or angle).

Figure 2:
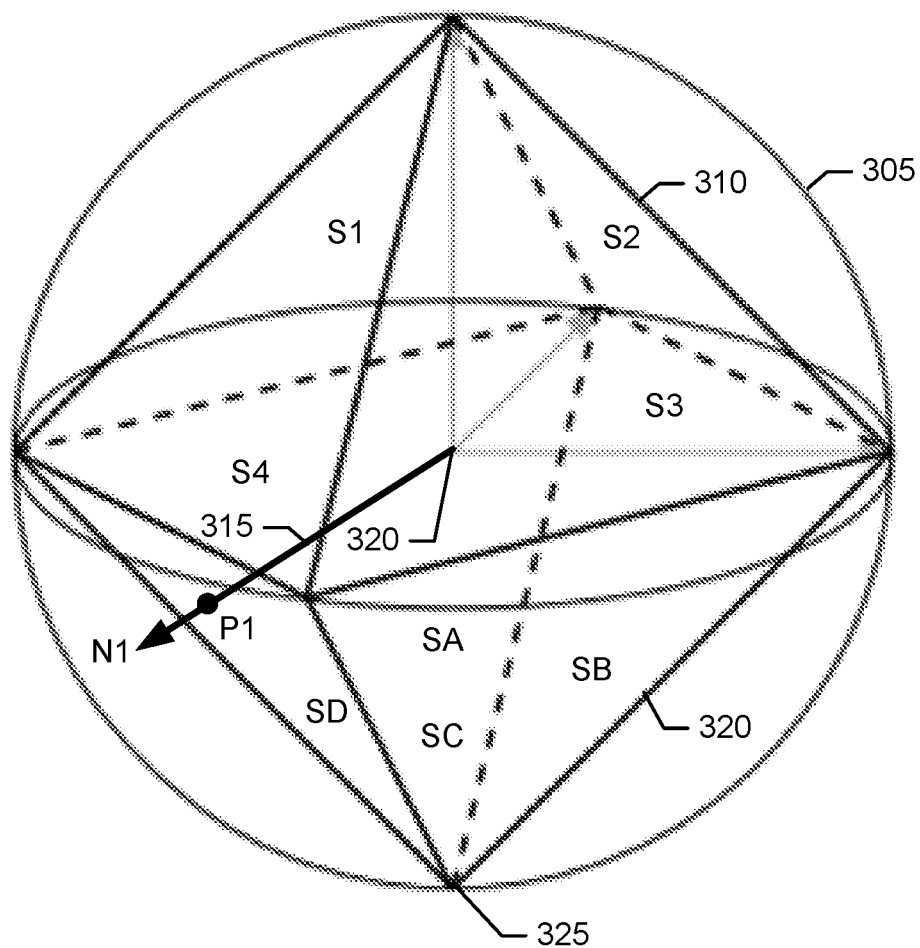
FIG. 2 illustrates a coordinate system according to at least one example embodiment.

One example coordinate system is illustrated in FIG. 2. The geometric shape shown in FIG. 2 can be referred to as a unit sphere. Points on the unit sphere 305 can be expressed with two values. The two values can be determined using a variety of methods, such as, by evaluating trigonometric functions, rational parameterizations of a circle, etc. Another method can include inscribing a geometric shape, e.g., an octahedron 310, into the unit sphere 305. A vector 315 from the center 320 of the sphere 305 defines the direction of a normal N1. The point P1 where the vector 315 intersects a surface of the octahedron 310 represents the normal N1. For each normal, the center 320 of the sphere 305 is logically placed at the origin of the normal N1 and then used to determine the two values representing the intersection of the normal N1 with the octahedron 310. Although not shown, other geometric shapes may be used. In general, an exemplary shape provides for ease of mapping (e.g., low computational complexity) of points on the sphere 305 to points on the shape, and points on the shape to points on a transformed representation of the shape. The octahedron shape disclosed herein is merely one example of a shape having these properties. Any techniques, algorithms, logic, circuits, etc. may be used to map a point on the unit sphere 305 to a point on a transformed representation of a shape.

The octahedron 310 shown in FIG. 2 has 8 surfaces S1-S4 and SA-SD. The surfaces S1-S4 represent the top half of the octahedron 310, and the surfaces SA-SD represent the bottom half of the octahedron 310.

The surfaces S1-S4, SA-SD of the octahedron 310 can be mathematically rearranged into an at least partially planar surface. In an example implementation, the octahedron 310 can be cut open at its lower tip 325 and along its 4 lower edges (one of which is designated at reference numeral 330. The inner triangles S1-S4 can correspond to the upper surfaces S1-S4 of the octahedron 310, and the outer triangles SA-SD can correspond to the lower surfaces SA-SD of the octahedron 310. However, that convention could be reversed. For example, the inner triangles could correspond to the lower surfaces, and the outer triangles could correspond to the upper surfaces. The position of point P1 can then be identified by two angles that identify the direction of the normal N1 and a distance on the normal N1 from the center 320. View-dependent quantization can be implemented to compress (e.g., using an encoder) the two angles and the distance.

Figure 3:
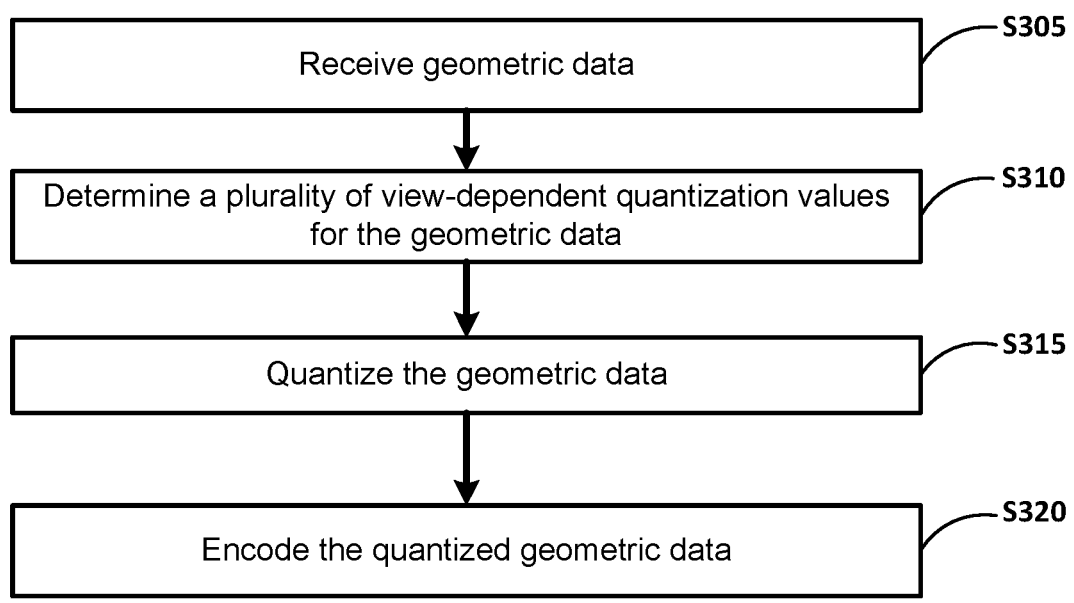
FIG. 3 illustrates a method for quantizing data according to at least one example embodiment.

The method steps described with regard to FIG. 3 may be executed as software code stored in a memory (e.g., at least one memory 410) associated with an encoder system (e.g., as shown in FIG. 4) and executed by at least one processor (e.g., processor 405) associated with the encoder system. However, alternative embodiments are contemplated such as an encoder or a decoder embodied as a special purpose processor.

For example, the method steps may be performed by an application-specific integrated circuit, or ASIC. For example, the ASIC may be configured as an encoder 425, and/or a controller 420. Although the steps described below are described as being executed by a processor, the steps are not necessarily executed by a same processor. In other words, at least one processor may execute the steps described below with regard to FIG. 3.

FIG. 3 illustrates a method for encoding data according to at least one example embodiment. As shown in FIG. 3, in step S305 geometric data is received. For example, the geometric data can be received from a data storage device or the like. For example, the geometric data may include data representing a number of points in a portion, region or block of a geometric construct representing a point cloud, and the data file may include data representing a position (e.g., a coordinate) of a point in a portion, region or block of a geometric construct representing a point cloud. The geometric data can include data indicating a position or viewpoint with respect to the scene and/or point cloud representing the scene.

In step S310 a plurality of view-dependent quantization values is determined for the geometric data. For example, the view-dependent quantization values can have varying or incremental distances (distance d1, d2 shown in FIG. 1A) between them. In an example implementation, the view-dependent quantization values can be spaced less coarsely close to the viewpoint and more coarsely with increasing distance from the viewpoint. Each quantized distance d can yield a (k−1)-dimensional surface of uniform distance with respect to the viewpoint. As discussed above, the view-dependent quantization values can be based on a POV. The POV can be predetermined by a creator (e.g., director, animator, or the like) of a stored or computer generated scene.

In step S315 the geometric data is quantized. For example, geometric data associated with a geometric construct is quantized. Point coordinates representing the geometric construct (also referred to as a point cloud) can be stored (e.g., in memory) as float or double precision bit representation. However, float or double precision can be more precise than is needed (e.g., to reconstruct the data with an acceptable amount of loss). As an example, a viewer in a VR environment may not need the precision of a float or double precision bit representation in order to have a satisfying viewing experience.

Quantization can include mapping or converting a range of values (e.g., float or double) to a single quantum value. In an example embodiment, quantization can convert the floating point values associated with the point cloud into one of a plurality of b-bit long integer representations based on (or equal to) the view-dependent quantization values. The floating point values associated with the point cloud can be mapped to a lower integer representation, a higher integer representation or a closest integer representation. Referring to FIG. 1A, point P1 could be mapped to the view-dependent quantization value associated with the line representing view-dependent quantization value 115-6 (lower), the view-dependent quantization value associated with the line representing view-dependent quantization value 115-7 (higher), or the view-dependent quantization value associated with one the line representing view-dependent quantization value 115-6 or the line representing view-dependent quantization value 115-7 based on minimizing error (e.g., based on the smaller of e1 or e2) as the closest integer representation.

In step S320 the quantized geometric data is encoded. For example, an encoding technique or standard can be applied to the quantized geometric data. For example a prediction scheme, an entropy process (e.g., Huffman coding, arithmetic coding, folding integer coding or the like) and/or the like can be applied to the quantized geometric data.

FIG. 4 illustrates an encoder system according to at least one example embodiment. In the example of FIG. 4, an encoder system 400 may be at least one computing device and should be understood to represent virtually any computing device configured to perform the methods described herein. As such, the encoder system 400 may be understood to include various standard components which may be utilized to implement the techniques described herein, or different or future versions thereof. By way of example, the encoder system 400 is illustrated as including at least one processor 405, as well as at least one memory 410 (e.g., a computer readable storage medium).

Thus, the at least one processor 405 may be utilized to execute instructions stored on the at least one memory 410, so as to thereby implement the various features and functions described herein, or additional or alternative features and functions. The at least one processor 405 and the at least one memory 410 may be utilized for various other purposes. In particular, the at least one memory 410 may be understood to represent an example of various types of memory and related hardware and software which might be used to implement any one of the modules described herein.

FIG. 4 illustrates the encoder system 400 according to at least one example embodiment. As shown in FIG. 4, the encoder system 400 includes the at least one processor 405, the at least one memory 410, a controller 420, and an encoder 425. The at least one processor 405, the at least one memory 410, the controller 420, and the encoder 425 are communicatively coupled via bus 415. The encoder 425 includes a quantization module 440, a view-dependent quantization value module 445 and a viewpoint module 450. Geometric data 430 is input to the encoder 425 and compressed bits 435 are output from the encoder 425.

The quantization module 440 can be configured to quantize the geometric data 430 as described in more detail above. The view-dependent quantization value module 445 can be configured to determine the view-dependent quantization values using at least one of the techniques described above. The viewpoint module 450 can be configured to determine a viewpoint associated with the geometric data. The view-dependent quantization value module 445 can be configured to use the determined viewpoint in order to determine the view-dependent quantization values. The quantization module 440 can be configured to quantize the geometric data 430 using the determined view-dependent quantization values.

The at least one processor 405 may be configured to execute computer instructions associated with the controller 420 and/or the encoder 425. The at least one processor 405 may be a shared resource. For example, the encoder system 400 may be an element of a larger system (e.g., a 2D or 3D scanner). Therefore, the at least one processor 405 may be configured to execute computer instructions associated with other elements (e.g., controller laser scanner position or movement) within the larger system.

The at least one memory 410 may be configured to store data and/or information associated with the encoder system 400. For example, the at least one memory 410 may be configured to store the geometric data, portions of the geometric data, positions of data points in the geometric data, a number of data points associated with a portion of the geometric data, and/or the like. For example, the at least one memory 410 may be configured to store geometric data, view-dependent quantization values, viewpoint data and the like as described above. The at least one memory 410 (and other elements of the encoder system 400 (or instructions therefor)) may be implemented as a non-transitory computer readable storage medium.

The controller 420 may be configured to generate various control signals and communicate the control signals to various blocks in encoder system 400. The controller 420 may be configured to generate the control signals in accordance with the methods described above. The controller 420 may be configured to control the encoder 425 to encode data associated with a geometric construct using quantization techniques according to example embodiments as described above. For example, the controller 420 may generate and communicate a control signal indicating a number of bits and a number of view-dependent quantization values used for a quantization scheme in the quantization module 440. For example, the controller 420 may generate and communicate a control signal indicating an entropy encoding scheme (e.g., Huffman coding, arithmetic coding, folding integer coding or the like).

FIG. 5 illustrates a decoder system according to at least one example embodiment. In the example of FIG. 5, a decoder system 500 may be at least one computing device and should be understood to represent virtually any computing device configured to perform the methods described herein. As such, the decoder system 500 may be understood to include various standard components which may be utilized to implement the techniques described herein, or different or future versions thereof. By way of example, the decoder system 500 is illustrated as including at least one processor 505, as well as at least one memory 510 (e.g., a computer readable storage medium).

Thus, the at least one processor 505 may be utilized to execute instructions stored on the at least one memory 510, so as to thereby implement the various features and functions described herein, or additional or alternative features and functions. The at least one processor 505 and the at least one memory 510 may be utilized for various other purposes. The at least one memory 510 may be understood to represent an example of various types of memory and related hardware and software which might be used to implement any one of the modules described herein.

FIG. 5 illustrates the decoder system 500 according to at least one example embodiment. As shown in FIG. 5, the decoder system 500 includes the at least one processor 505, the at least one memory 510, a controller 520, and an decoder 525. The at least one processor 505, the at least one memory 510, the controller 520, and the decoder 525 are communicatively coupled via bus 515. The decoder 525 includes a de-quantization module 530. Compressed bits 435 are input to the decoder 525 and geometric data 430 is output from the decoder 525. The de-quantization module 530 can be configured to de-quantize the compressed bits 435 using inverse techniques based on the quantization techniques described in more detail above.

The at least one processor 505 may be configured to execute computer instructions associated with the controller 520 and/or the decoder 525. The at least one processor 505 may be a shared resource. For example, the decoder system 500 may be an element of a larger system (e.g., a mobile device). Therefore, the at least one processor 505 may be configured to execute computer instructions associated with other elements (e.g., web browsing or wireless communication) within the larger system.

The at least one memory 510 may be configured to store data and/or information associated with the decoder system 500. For example, the at least one memory 510 may be configured to store compressed bits, de-compressed geometric data, portions of the geometric data, positions of data points in the geometric data, a number of data points associated with a portion of the geometric data, and/or the like. For example, the at least one memory 510 may be configured to store de-compressed geometric data, view-dependent quantization values, viewpoint data and the like as described above. The at least one memory 510 (and other elements of the decoder system 500 (or instructions therefor)) may be implemented as a non-transitory computer readable storage medium.

The controller 520 may be configured to generate various control signals and communicate the control signals to various blocks in decoder system 500. The controller 520 may be configured to generate the control signals in accordance with the methods described above. The controller 520 may be configured to control the decoder 525 to decode data associated with a geometric construct using quantization techniques according to example embodiments as described above. For example, the controller 520 may generate and communicate a control signal indicating a number of bits and a number of view-dependent quantization values used for a quantization scheme in the quantization module 640. For example, the controller 520 may generate and communicate a control signal indicating an entropy decoding scheme (e.g., Huffman coding, arithmetic coding, folding integer coding or the like).

Example implementations may include the compression of 3D scenes with high definition (e.g., similar to a high definition image). These 3D scenes may be represented or stored as point clouds, as textured triangles, or the like with a large number of points. In order to communicate and display these 3D scenes to/on devices with limited capabilities (e.g., processing capabilities, memory, bandwidth, and/or the like), the POV can be used in an encoder configured to use a view-dependent quantization technique to limit high definition rendering to a small region of the 3D scene. For example, the positions of the vertices of the triangles can be encoded using view-dependent quantization. Accordingly, the encoded data for transmission can be relatively small and the decoded scene can use less memory on the mobile device (when decoded) as compared to other quantization techniques.

An example may be implemented as software configured to show real estate for lease or sale. As an example, a high definition 3D scene for each room in a house may be generated (e.g., using CGI, a scanner, a camera, and/or the like). The software may store each 3D scene in a memory of a server. An agent may then select one or more POV for each room. For example, one or more corner could be selected. Then a user of a VR device (e.g., a VR device using, for instance, a mobile device as a display) can interact with the software to select a room in the house and/or a specific POV for the room. The software can also be configured to allow the user to jump from room to room. The 3D scene can be encoded using the view-dependent quantization technique. As a result, 6 degrees of freedom of movement within a relatively small area around the POV can be achieved. The 6 degrees of freedom include two for looking into a certain direction, one for being able to rotate the viewer's head around the axis of view, and 3 for translating in the POV in the x, y, and z directions. Therefore, when decoded for rendering by the VR device, the user can move around (e.g., look closer, look to the left, right, up, down, look just past, look under, and the like) in a relatively small area around the POV, in order to get a better impression of the room, for example. The relatively small area around the POV can be rendered in high definition, whereas the area outside the relatively small area can be rendered at a progressively less definition away from the POV.

Figure 6:
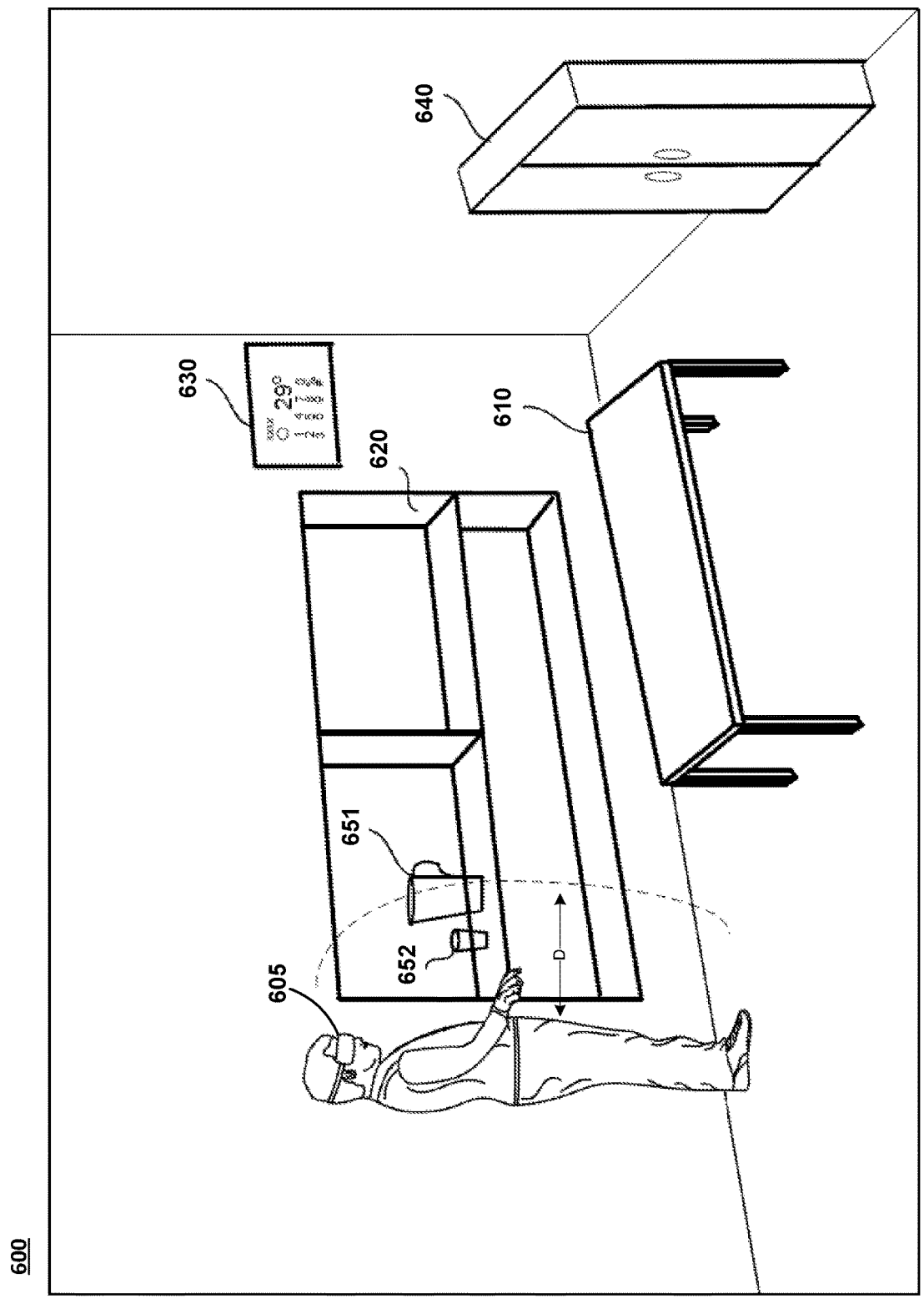
FIG. 6 illustrates an example of a scene according to at least one example embodiment.

The example scenario shown in FIG. 6 illustrates a 3D scene that can be shown on a VR device associated with this real estate implementation. The example scenario shown in FIG. 6 will be described with respect to a user wearing an head mounted display (HMD) configured to render a 3D scene, with the user's field of view confined to the virtual environment generated by the HMD. However, the concepts and features described below with respect to FIG. 6 may also be applied to other types of displays. Further, as discussed above, the 3D scene does not necessarily have to be displayed in an augmented and/or virtual reality environment. For example, the 3D scene can be compressed using the view-dependent quantization technique described above, then decompressed for use in a software program to manipulate the scene (e.g., using CGI), to analyze the scene and/or perform some other function on the decoded data representing the 3D scene (e.g., the point cloud).

FIG. 6 illustrates a third person view of a user, wearing an HMD 605, in a space defining the 3D scene 600. In the example shown in FIG. 6, a table 610, a shelf 620, a wall mount 630, a cabinet 640 are displayed to the user. A pitcher 651 and a glass 652 are displayed on the shelf 620. In the example shown in FIG. 6, the defined distance, or proximity/zone/area D relative to the user is illustrated as a somewhat spherical area surrounding the user, for example, within typical arm's reach. The 3D scene 600 can be compressed using the view-dependent quantization technique such that the rendered 3D scene 600 is of a sufficiently high resolution that the user can look around within the proximity/zone/area D and see the curvature and contents of the pitcher 651 and the glass 652. In other words, the user can see the curvature of the pitcher 651 and the glass 652, see the portions of the shelf 620 behind the pitcher 651 and the glass 652, and other close by details of the 3D scene 600. Further, the 3D scene 600 can be compressed using the view-dependent quantization technique such that the rendered 3D scene 600 definition progressively decreases as the viewer views the 3D scene 600 past the proximity/zone/area D to where the cabinet 640 is rendered with the least definition and the table 610 is rendered with an in-between definition.

The implementation shown in FIG. 6 can be modified in a number of ways. For example, other POV selections could be made. For example the POV could be based on viewing the cabinet 640. The scene 600 could include or be configured to display other elements (e.g., furniture). An element (e.g., wall mount 630) within the scene could periodically be changed. Elements in the scene 600 can be configured to have element (e.g., walls) characteristics (e.g., color) changed. Other viewers of the scene 600 could be layered into the scene 600 so that the viewer could interact with the other viewers.

The implementation of a scene illustrated in FIG. 6 is just one of many possible scenes. For example, the scene could be of an environment (e.g., woods, cityscape, playing field, and the like), an imaginary location, random data, and the like. Interacting with the scene can be implemented in VR, mobile VR, 3D television, in software, and the like.

Referring again to FIG. 1A, points P1 and P2 represent a position within the point cloud and are described as though the scene and POV are static, previously captured/generated and stored. However, other scenarios are possible. For example, live action video could be captured in real time. In this case, the POV could be static and the scene could be dynamic (e.g. as live action). As a result, the position of points P1 and P2 (and other points within the point cloud) do not change. The POV can be based on the position of the device or devices used to capture the data (e.g., image or scan data) used to generate the scene.

In another live action example, the POV could be dynamic and the scene could be static. In this case, the position of points P1 and P2 (and other points within the point cloud) change relative to the POV. In other words, the viewpoint changes as the POV moves. Therefore, the view-dependent quantization values could change (e.g., be calculated or determined) for each frame. This change in perspective causes the color data associated with points P1 and P2 (and other points within the point cloud) to appear to change while keeping the POV and the viewpoint to appear static.

In another live action example, the POV could be dynamic and the scene could be dynamic (e.g., a skier skiing down a slope). In this case, the position of points P1 and P2 (and other points within the point cloud) and the scene changes relative to the POV. Therefore, the view-dependent quantization values could change (e.g., be calculated or determined) for each frame and the color data associated with the point cloud changes for each frame.

Further, in a scenario where the 3D scene can be associated with a portion of a video (e.g., one or more frame), the video can be paused or stopped to cause the 3D scene to be encoded using view-dependent quantization. For example, the room example implementation described above could be a portion of a video. In this scenario, as a viewer of the video (e.g., in a virtual reality environment) enters the room and stops, the 3D scene associated with the frame of the video can then be encoded using view-dependent quantization with view-dependent quantization values based on, for example, the position within the room that the viewer stopped.

In some implementations, the viewpoint can be static in that the position of the POV does not move with regard to the scene (e.g., point cloud representing an object). For example, the POV can be fixed in an environment that changes over time (e.g., a scene including a city center with automobiles and people moving about) that includes some static elements (e.g., buildings) as well.

In some implementations, the viewpoint can be dynamic in that the position of the POV can move with regard to the scene (e.g., point cloud representing an object). For example, the POV can be that of a viewing user moving through a scene (e.g., a skier traveling down a slope). In this case the scene is changing because the position of the skier changes. Further, that which is viewed in the scene can change as the viewing user moves her head (e.g., the skier moves her head side-to-side, up-down and the like).

Combinations of each of the above example scenarios are possible. For example, POV could be periodically moving and stopped. Therefore, the POV and/or the scene can be dynamic or static at any point in time. As a result, a viewpoint (POV) relative to the point cloud (e.g., sphere 105) could be stored or associated with the data. For example, a point closest to the POV could be identified or labeled as such. For example, a point closest to the POV could be identified or labeled based on a player in a game, by an animator of a video, by a director of a video, and the like.

Figure 7:
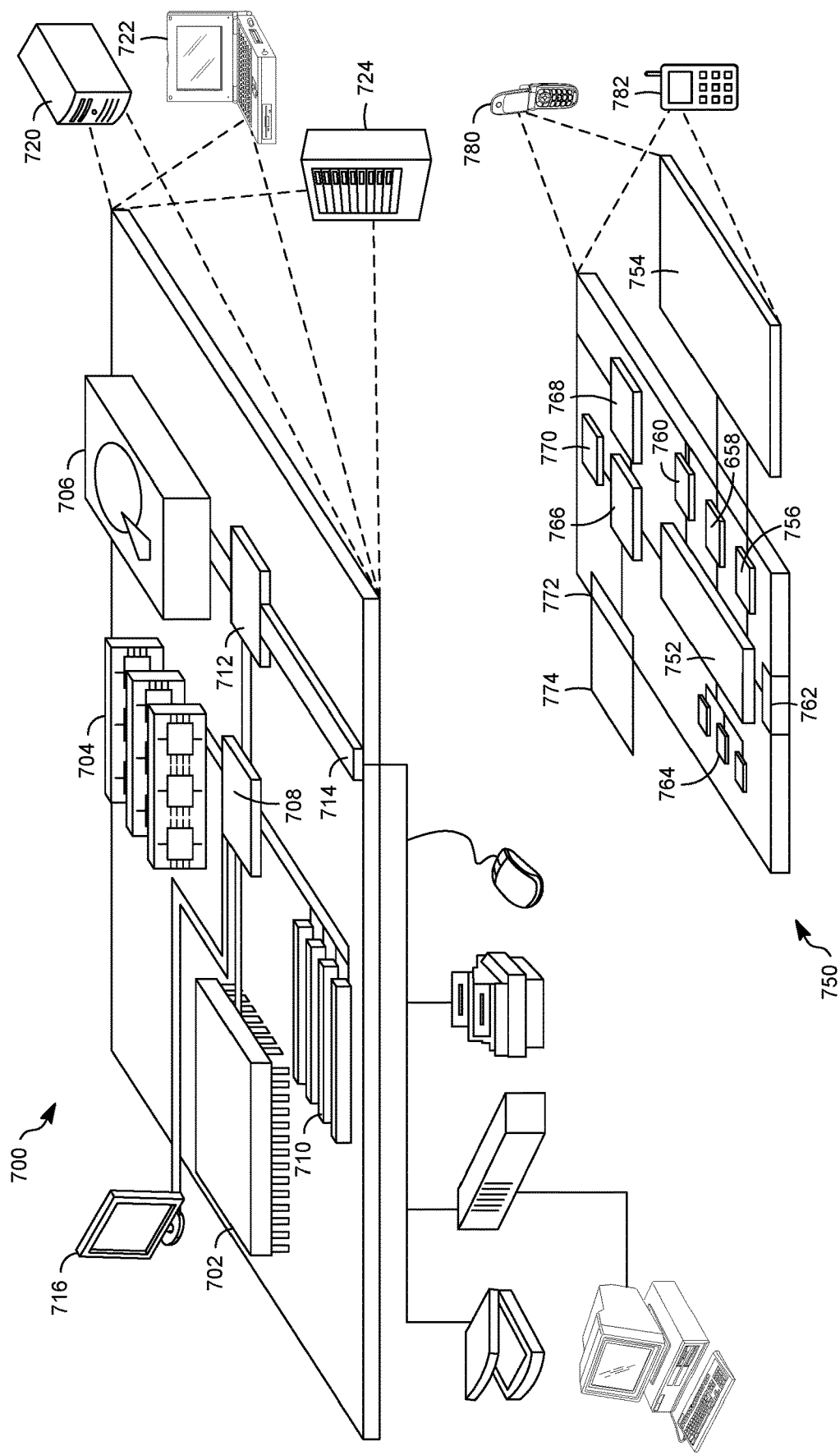
FIG. 7 shows an example of a computer device and a mobile computer device according to at least one example embodiment.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may also be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory computer storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A system for encoding geometric data, the system comprising:
   a processor; and
   a memory, the memory including code as instructions that cause the processor to:
   receive geometric data and a viewpoint associated with the geometric data,
   quantize the geometric data based on the viewpoint using a plurality of view-dependent quantization values, quantizing the geometric data including:
      transforming a distance z between a point and the viewpoint to a quantized distance $z'=1/(1+z)$, the quantized distance having a density that is a function of a distance from the viewpoint,
      mapping the point of the geometric data to one of the view-dependent quantization values based on the quantized distance,
      each of the quantized distances having a different dimension based on the function, and
      each of the view-dependent quantization values having a same bit length integer representation based on a corresponding view-dependent quantization value, and
   encode the quantized geometric data.

2. The system of claim 1, wherein the distances are less coarse close to the viewpoint and more coarse with increasing distance from the viewpoint.

3. The system of claim 1, wherein the view-dependent quantization values are re-determined based on at least one of a change in the viewpoint and a change in a scene represented by the geometric data.

4. The system of claim 1, wherein the geometric data represents a point cloud and the geometric construct is a two or more dimensional shape encompassing the point cloud.

5. The system of claim 1, wherein the quantizing of the geometric data includes one of:
   mapping a value associated with a point of the geometric data to the view-dependent quantization value that is less than the value associated with the point,
   mapping a value associated with a point of the geometric data to the view-dependent quantization value that is greater than the value associated with the point, and
   mapping a value associated with a point of the geometric data to the view-dependent quantization value that minimizes an error associated with the point.

6. A method for encoding geometric data, the method comprising:
   receiving geometric data and a viewpoint associated with the geometric data;
   quantizing a first point of the geometric data based on a distance z between the first point and the viewpoint using a first view-dependent quantization value, the first view-dependent quantization value being based on a transformed distance $z'=1/(a*z^c+b)$, with $a>0$, $b>0$, and $c>=1$;
   quantizing a second point of the geometric data based on a distance between the second point and the viewpoint using a second view-dependent quantization value, the second point being further from the viewpoint than the first point, the second view-dependent quantization value corresponding to one of a plurality of quantized distances that is more coarse than one of the plurality of quantized distances corresponding to the first view-dependent quantization value, and the second view-dependent quantization value having a same bit length integer representation as the first view-dependent quantization value; and
   encoding the quantized geometric data.

7. The method of claim 6, wherein the quantizing of the geometric data includes converting a float value or double precision value associated with the geometric data into a b-bit integer representation.

8. The method of claim 6, wherein the geometric data represents a point cloud and the geometric construct is a two or more dimensional shape encompassing the point cloud.

9. The method of claim 6, wherein the quantizing of the geometric data includes one of:
mapping a value associated with at least one of the first point and the second point to a view-dependent quantization value that is less than a value associated with the first point or the second point,
mapping a value associated with at least one of the first point and the second point to a view-dependent quantization value that is greater than a value associated with the first point or the second point, and
mapping a value associated with at least one of the first point and the second point to a view-dependent quantization value that minimizes an error associated with the point.

10. The method of claim 6, wherein an artifact associated with the first point is relatively small as compared to an artifact associated with the second point.

11. A non-transitory computer readable storage medium having code as instructions for encoding geometric data that cause a processor to:
receive geometric data and a viewpoint associated with the geometric data;
quantize the geometric data based on the viewpoint using a plurality of view-dependent quantization values, quantizing the geometric data including:
determining a distance between a point of the geometric data and the viewpoint,
transforming the distance z to a quantized distance $z'=1/(z+d)$ for any number $d>0$ that is less coarse when closer to the viewpoint and more coarse when a greater distance from the viewpoint,
mapping the point of the geometric data to one of the view-dependent quantization values based on the quantized distance,
each of the quantized distances having a different dimension, and
each of the view-dependent quantization values having a same bit length integer representation based on a corresponding view-dependent quantization value; and
encode the quantized geometric data.

12. The non-transitory computer readable storage medium of claim 11, wherein the quantizing of the geometric data includes one of:
mapping a value associated with the point of the geometric data to the view-dependent quantization value that is less than the value associated with the point,
mapping a value associated with the point of the geometric data to the view-dependent quantization value that is greater than the value associated with the point, and
mapping a value associated with the point of the geometric data to the view-dependent quantization value that minimizes an error associated with the point.

13. The non-transitory computer readable storage medium of claim 11, wherein the view-dependent quantization values are re-determined based on at least one of a change in the viewpoint and a change in a scene represented by the geometric data.

14. The non-transitory computer readable storage medium of claim 11, wherein an artifact associated with the quantized distance that is less coarse is relatively small as compared to an artifact associated with the quantized distance that is more coarse.

* * * * *